US006887641B2

(12) United States Patent
Dickerson et al.

(10) Patent No.: US 6,887,641 B2
(45) **Date of Patent: *May 3, 2005**

(54) MAMMOGRAPHY IMAGING METHOD USING HIGH PEAK VOLTAGE AND RHODIUM OR TUNGSTEN ANODES

(75) Inventors: Robert E. Dickerson, Hamlin, NY (US); William E. Moore, Macedon, NY (US); David J. Steklenski, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 203 days.

This patent is subject to a terminal disclaimer.

(21) Appl. No.: 10/299,759

(22) Filed: Nov. 19, 2002

(65) Prior Publication Data

US 2004/0096028 A1 May 20, 2004

(51) Int. Cl.$^7$ .................................... G03B 42/02
(52) U.S. Cl. ............................ 430/139; 430/966
(58) Field of Search ...................... 430/139, 966

(56) References Cited

U.S. PATENT DOCUMENTS

| | | | | |
|---|---|---|---|---|
| 4,659,654 A | | 4/1987 | Metoki et al. | 430/567 |
| 4,710,637 A | | 12/1987 | Luckey et al. | 250/486.1 |
| 5,455,139 A | | 10/1995 | Wada et al. | 430/139 |
| 5,738,981 A | | 4/1998 | Dickerson et al. | 430/509 |
| 5,759,754 A | | 6/1998 | Dickerson | 430/502 |
| 5,853,967 A | | 12/1998 | Dickerson | 430/502 |
| 6,033,840 A | | 3/2000 | Dickerson | 430/502 |
| 6,037,112 A | | 3/2000 | Dickerson | 430/502 |
| 6,673,507 B1 | | 1/2004 | Dickerson et al. | 430/139 |
| 6,794,105 B2 | | 9/2004 | Adin et al. | 430/139 |
| 6,794,106 B2 | | 9/2004 | Dickerson et al. | 430/139 |
| 2004/0096039 A1 | * | 5/2004 | Dickerson et al. | 378/173 |

OTHER PUBLICATIONS

U.S. Appl. No. 10/299,123—(D–84259) filed on even date herewith, titled *Radiographic Silver Halide Film for Mammography With Reduced Dye Stain,* by Adin et al.

U.S. Appl. No. 10/299,936—(D–84261) filed on even date herewith, titled *Radiographic Film With Improved Signal detection For Mammography,* by Adin et al.

U.S. Appl. No. 10/299,237—(D–84262) filed on even date herewith, titled *Radiographic Film For Mammography With Improved Processability* by Adin et al.

U.S. Appl. No. 10/299,458—(D–84263) filed on even date herewith, titled *Radiographic Mammography Film Having Improved Processability. Imaging Assembly And Method of Imaging* by Adin et al.

U.S. Appl. No. 10/299,682—(D–84264) filed on even date herewith, titled *Radiographic Imaging Assembly For Mammography,* by Dickerson et al.

U.S. Appl. No. 10/299,765—(D–84710) filed on even date herewith, titled *Mammography Film And Imaging Assembly For Use With Rhodium or Tungsten Anodes,* Dickerson et al.

U.S. Appl. No. 10/299,941—(D–84711) filed on even date herewith, titled *Mammography Imaging Method Using High Peak Voltage,* by Dickerson et al.

* cited by examiner

*Primary Examiner*—Hoa Van Le
(74) *Attorney, Agent, or Firm*—J. Lanny Tucker

(57) ABSTRACT

A method of mammography imaging includes exposing a patient to a peak voltage greater than 29 kVp using X-radiation generating equipment comprising rhodium or tungsten anodes. The film used in this method comprises a cubic grain silver halide emulsion layer on one side of the support and a tabular grain silver halide emulsion layer on the other side. The cubic grain silver halide emulsion layer comprises a combination of first and second spectral sensitizing dyes that provides a combined maximum J-aggregate absorption on the cubic silver halide grains of from about 540 to about 560 nm. The first spectral sensitizing dye is an anionic benzimidazole-benzoxazole carbocyanine, the second spectral sensitizing dye is an anionic oxycarbocyanine. The cubic grain silver halide emulsion layer also includes a mixture of gelatin or a gelatin derivative and a second hydrophilic binder other than gelatin or a gelatin derivative. The cubic silver halide grains comprise from about 1 to about 20 mol % chloride and from about 0.25 to about 1.5 mol % iodide, both based on total silver in the cubic grain emulsion layer, which cubic silver halide grains have an average ECD of from about 0.65 to about 0.8 μm. Moreover, the cubic silver halide grains are doped with a hexacoordination complex compound within part or all of the innermost 95% of the grains. The film can be exposed to provide a black-and-white image having a d(γ)/d(log E) value greater than 5.

19 Claims, 1 Drawing Sheet

MAMMOGRAPHY IMAGING METHOD USING HIGH PEAK VOLTAGE AND RHODIUM OR TUNGSTEN ANODES

FIELD OF THE INVENTION

This invention is directed to radiography. In particular, it is directed to a method of imaging a specific radiographic silver halide film or imaging assembly that are useful for providing medical diagnostic images of soft tissues such as in mammography. This method can be carried out to advantage using high peak voltage and rhodium or tungsten anodes in the imaging equipment.

BACKGROUND OF THE INVENTION

The use of radiation-sensitive silver halide emulsions for medical diagnostic imaging can be traced to Roentgen's discovery of X-radiation by the inadvertent exposure of a silver halide film. Eastman Kodak Company then introduced its first product specifically that was intended to be exposed by X-radiation in 1913.

In conventional medical diagnostic imaging the object is to obtain an image of a patient's internal anatomy with as little X-radiation exposure as possible. The fastest imaging speeds are realized by mounting a dual-coated radiographic element between a pair of fluorescent intensifying screens for imagewise exposure. About 5% or less of the exposing X-radiation passing through the patient is adsorbed directly by the latent image forming silver halide emulsion layers within the dual-coated radiographic element. Most of the X-radiation that participates in image formation is absorbed by phosphor particles within the fluorescent screens. This stimulates light emission that is more readily absorbed by the silver halide emulsion layers of the radiographic element.

Examples of radiographic element constructions for medical diagnostic purposes are provided by U.S. Pat. No. 4,425,425 (Abbott et al.) and U.S. Pat. No. 4,425,426 (Abbott et al.), U.S. Pat. No. 4,414,310 (Dickerson), U.S. Pat. No. 4,803,150 (Kelly et al.), U.S. Pat. No. 4,900,652 (Kelly et al.), U.S. Pat. No. 5,252,442 (Tsaur et al.), and *Research Disclosure*, Vol. 184, August 1979, Item 18431.

While the necessity of limiting patient exposure to high levels of X-radiation was quickly appreciated, the question of patient exposure to even low levels of X-radiation emerged gradually. The separate development of soft tissue radiography, which requires much lower levels of X-radiation, can be illustrated by mammography. The first intensifying screen-film combination (imaging assembly) for mammography was introduced to the public in the early 1970's. Mammography film generally contains a single silver halide emulsion layer and is exposed by a single intensifying screen, usually interposed between the film and the source of X-radiation. Mammography utilizes low energy X-radiation, that is radiation that is predominantly of an energy level less than 40 keV.

U.S. Pat. No. 6,033,840 (Dickerson) and U.S. Pat. No. 6,037,112 (Dickerson) describe asymmetric imaging elements and processing methods for imaging soft tissue.

Problem to be Solved

In mammography, as in many forms of soft tissue radiography, pathological features that are to be identified are often quite small and not much different in density than surrounding healthy tissue. Thus, the use of films with relatively high average contrast (in the range of from 2.5 to 3.5) over a density range of from 0.25 to 2.0 is typical. Limiting the amount of X-radiation requires higher absorption of the X-radiation by the intensifying screen and lower X-radiation exposure of the film. This can contribute to loss of image sharpness and contrast. Thus mammography is a very difficult task in medical radiography.

Radiographic imaging of soft tissue as in mammography is usually carried out using low peak voltage (kVp), for example, 28 kVp, from the imaging equipment to maximize image sharpness. However, the consequence of low peak voltage is higher patient dose.

Moreover, radiographic imaging of soft tissue is usually carried out using X-ray equipment that includes an X-ray tube with a rotating anode. The anode is the "source" of the X-radiation that is created when electrons interact with the electrons or nuclei of the metallic atoms in the anode. To maximize image quality, molybdenum anodes are generally used in such equipment. Rhodium anodes are also known in the art particularly for lowering patient exposure to radiation, but in the case of mammography, poorer image quality is usually results when they are used There remains a need in mammography for a way to minimize patient exposure to radiation while providing optimal radiographic image quality such as image contrast.

SUMMARY OF THE INVENTION

The present invention provides an advance in the art with a method of imaging for mammography comprising exposing a patient to X-radiation at a peak voltage greater than 28 kVp using an X-radiation generating device comprising rhodium or tungsten anodes, and providing a black-and-white image of the exposed patient using an imaging assembly comprising:

A) a radiographic silver halide film that comprises a support having first and second major surfaces and that is capable of transmitting X-radiation, the radiographic silver halide film having disposed on the first major support surface, one or more hydrophilic colloid layers including at least one cubic grain silver halide emulsion layer, and having disposed on the second major support surface, one or more hydrophilic colloid layers including at least one tabular grain silver halide emulsion layer, wherein the film can be exposed to provide a black-and-white image having a $d(\gamma)/d(\log E)$ value greater than 5, and B) a fluorescent intensifying screen that comprises an inorganic phosphor capable of absorbing X-rays and emitting electromagnetic radiation having a wavelength greater than 300 nm.

In still other embodiments, this invention provides a method of imaging for mammography comprising exposing a patient to X-radiation at a peak voltage greater than 28 kVp using an X-radiation generating device comprising rhodium or tungsten anodes, and providing a black-and-white image of the exposed patient using an imaging assembly comprising:

A) a radiographic silver halide film that has a photographic speed of at least 100 and comprises a support having first and second major surfaces and that is capable of transmitting X-radiation, the radiographic silver halide film having disposed on the first major support surface, one or more hydrophilic colloid layers including at least one cubic grain silver halide emulsion layer, and having disposed on the second major support surface, one or more hydrophilic colloid layers including at least one tabular grain silver halide emulsion layer, wherein the cubic grain silver halide emulsion layer comprises:

1) a combination of first and second spectral sensitizing dyes that provides a combined maximum J-aggregate absorption on the cubic silver halide grains of from about 540 to about 560 nm, and wherein the first spectral sensitizing dye is an anionic benzimidazole-benzoxazole carbocyanine, the second spectral sensitizing dye is an anionic oxycarbocyanine, and the first and second spectral sensitizing dyes are present in a molar ratio of from about 0.25:1 to about 4:1, 2) a mixture of a first hydrophilic binder that is gelatin or a gelatin derivative and a second hydrophilic binder other than gelatin or a gelatin derivative, wherein the weight ratio of the first hydrophilic binder to the second hydrophilic binder is from about 2:1 to about 5:1, and the level of hardener in the cubic grain silver halide emulsion layer is from about 0.4 to about 1.5 weight % based on the total weight of the first hydrophilic binder in the cubic grain silver halide emulsion layer, 3) cubic silver halide grains comprising from about 1 to about 20 mol % chloride and from about 0.25 to about 1.5 mol % iodide, both based on total silver in the cubic grain emulsion layer, which cubic silver halide grains have an average ECD of from about 0.65 to about 0.8 μm, and 4) cubic silver halide grains that are doped with a hexacoordination complex compound within part or all of 95% of the innermost volume from the center of the cubic silver halide grains, and B) a fluorescent intensifying screen that comprises an inorganic phosphor capable of absorbing X-rays and emitting electromagnetic radiation having a wavelength greater than 300 nm.

In preferred embodiments, the present invention provides a method of imaging for mammography comprising exposing a patient to X-radiation at a peak voltage greater than 28 kVp using an X-radiation generating device comprising rhodium anodes, and providing a black-and-white image of the exposed patient using an imaging assembly comprising:

A) a radiographic silver halide film having a photographic speed of at least 100 and comprising a transparent film support having first and second major surfaces and that is capable of transmitting X-radiation, the radiographic silver halide film having disposed on the first major support surface, one or more hydrophilic colloid layers including at least one silver halide emulsion layer, and having disposed on the second major support surface, one or more hydrophilic colloid layers including at least one tabular grain silver halide emulsion layer, the film also comprising a protective overcoat layer disposed on both sides of the support, wherein the cubic grain silver halide emulsion layer comprises:

1) a combination of first and second spectral sensitizing dyes that provides a combined maximum J-aggregate absorption of from about 545 to about 555 nm when the dyes are absorbed on the surface of the cubic silver halide grains, wherein the first spectral sensitizing dye is the following Dye A-2, and wherein the second spectral sensitizing dye is following Dye B-1, the first and second spectral sensitizing dyes being present in a molar ratio of from about 0.5:1 to about 1.5:1, and the total spectral sensitizing dyes in the film is from about 0.25 to about 0.75 mg/mole of silver,

A-2

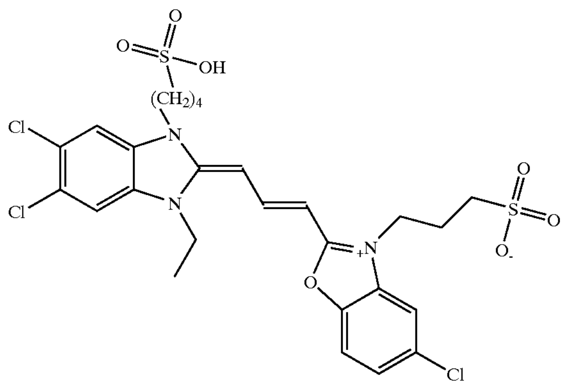

B-1

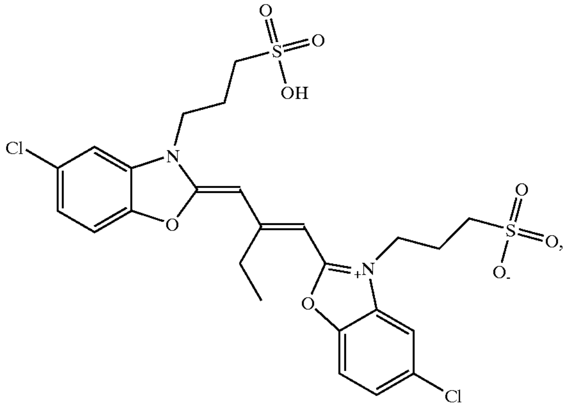

2) a mixture of a first hydrophilic binder that is gelatin or a gelatin derivative and a second hydrophilic binder that is a dextran or polyacrylamide, wherein the weight ratio of the first hydrophilic binder to the second hydrophilic binder is from about 2.5:1 to about 3.5:1 and the level of hardener in the cubic grain silver halide emulsion is from about 0.5 to about 1.5 weight % based on the total weight of the first hydrophilic binder in the cubic grain silver halide emulsion layer, 3) cubic silver halide grains comprising from about 10 to about 20 mol % chloride and from about 0.5 to about 1 mol % iodide, both based on total silver in the cubic grain silver halide emulsion layer, which cubic silver halide grains have an average ECD of from about 0.72 to about 0.76 μm, and 4) cubic silver halide grains that are doped with a hexacoordination complex compound within 75 to 80% of the innermost volume from the center of the cubic silver halide grains, wherein the hexacoordination complex compound is represented by the following Structure I:

$$[ML_6]^n$$

wherein M is $Fe^{+2}$, $Ru^{+2}$, $Os^{+2}$, $Co^{+3}$, $Rh^{+3}$, $Ir^{+3}$, $Pd^{+3}$, or $Pt^{+4}$, L represents coordination complex ligands that can be the same or different provided that at least three of the ligands are cyanide ions, and n is −2, −3, or −4, and B) a single fluorescent intensifying screen that comprises an inorganic phosphor capable of absorbing X-rays and emitting electromagnetic radiation having a wavelength greater than 300 nm, the inorganic phosphor being coated in admixture with a polymeric binder in a phosphor layer disposed on a flexible support and having a protective overcoat disposed over the phosphor layer.

The methods of the present invention can further comprise processing the radiographic silver halide film, sequentially, with a black-and-white developing composition and a fixing composition, the processing being carried out within 90 seconds, dry-to-dry.

The present invention provides a means for providing radiographic images for mammography unexpectedly exhibiting improved image quality while minimizing radiation dosage to which patients are exposed. In particular, image quality can be improved with the present invention by increasing image contrast, decreasing "noise" (for example, film granularity), or both. These advantages are possible with a unique radiographic film and imaging assembly and thereby allowing patient imaging to be carried out using higher peak voltage (greater than 28 kVp) than normal as well as X-radiation generating equipment that includes rhodium or tungsten anodes. Thus, the imaging method of the present invention is carried out whereby patient dosage is reduced without sacrificing image quality.

In has also been found that the radiographic silver halide films useful in the practice of the present invention provide images that exhibit desired contrast in the mid-scale region. This contrast can be evaluated by calculating the derivative (or slope) of a gamma vs. log E curve to obtain a term "d(γ)/d(log E)" that is defined in more detail below. In the practice of the present invention, the films can exhibit a d(γ)/d(log E) greater than 5 and preferably greater than 5.5.

In addition, all other desirable sensitometric properties are maintained and the radiographic film can be rapidly processed in the same conventional processing equipment and compositions.

DETAILED DESCRIPTION OF THE INVENTION

Figure 1:
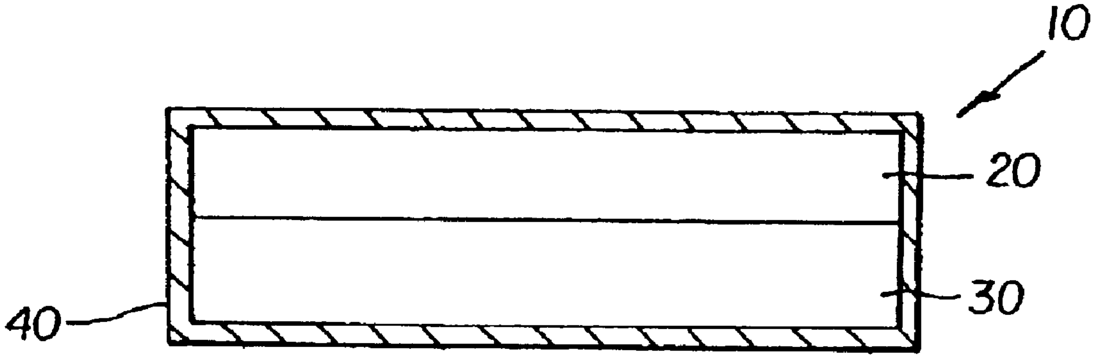
FIG. 1 is a schematic cross-sectional illustration of an embodiment of a radiographic silver halide film and a single fluorescent intensifying screen in a cassette holder that can be used in the practice of this invention.

Definition of Terms:

The term "contrast" as herein employed indicates the average contrast derived from a characteristic curve of a radiographic film using as a first reference point (1) a density ($D_1$) of 0.25 above minimum density and as a second reference point (2) a density ($D_2$) of 2.0 above minimum density, where contrast is ΔD (i.e. 1.75)÷Δlog E (log $E_2$−log $E_1$), $E_1$ and $E_2$ being the exposure levels at the reference points (1) and (2).

"Gamma" is described as the instantaneous rate of change of a D log E sensitometric curve or the instantaneous contrast at any log E value.

"Photographic speed" for the radiographic films refers to the exposure necessary to obtain a density of at least 1.0 plus $D_{min}$.

"Photographic speed" for the fluorescent intensifying screens refers to the percentage photicity relative to a conventional KODAK MinR fluorescent intensifying screen.

"Photicity" is the integral from the minimum wavelength of the light emitted by the screen to the maximum wavelength of the intensity of light emitted by the screen divided by the sensitivity of the recording medium (film). This is shown by the following equation where I(λ) is the intensity of the light emitted by the screen at wavelength λ and S(λ) is the sensitivity of the film at wavelength λ. S(λ) is in units of ergs/$cm^2$ required to reach a density of 1.0 above base plus fog.

$$\text{Photicity} = \int_{\lambda\,min}^{\lambda\,max} \frac{I(\lambda)}{S(\lambda)}\, d\lambda$$

Image tone can be evaluated using conventional CIELAB (Commission Internationale de l'Eclairage) a* and b* values that can be evaluated using the techniques described by Billmeyer et al., *Principles of Color Technology*, $2^{nd}$ Edition, Wiley & Sons, New York, 1981, Chapter 3. The a* value is a measure of reddish tone (positive a*) or greenish tone (negative a*). The b* value is a measure of bluish tone (negative b*) or yellowish tone (positive b*).

The term "d(γ)/d(log E)" refers to a mathematical derivative or the slope of a gamma vs. log E sensitometric curve. This term can be obtained by providing a conventional D(density) vs. log E curve, mathematically differentiating that curve to provide a γ(gamma) vs. log E sensitometric curve, and then determining the slope of the "leading edge" (or rising side) of that curve.

Exposure latitude refers to the width (in log E terms) of a γ vs. log E sensitometric curve when measured at a given gamma value. The curve width is measured in log E terms that upon conversion to the appropriate "antilog" provides a ratio of a specific number to 1.

The term "fully forehardened" is employed to indicate the forehardening of hydrophilic colloid layers to a level that limits the weight gain of a radiographic film to less than 120% of its original (dry) weight in the course of wet processing. The weight gain is almost entirely attributable to the ingestion of water during such processing.

The term "rapid access processing" is employed to indicate dry-to-dry processing of a radiographic film in 45 seconds or less. That is, 45 seconds or less elapse from the time a dry imagewise exposed radiographic film enters a wet processor until it emerges as a dry fully processed film.

In referring to grains and silver halide emulsions containing two or more halides, the halides are named in order of ascending molar concentrations.

The term "equivalent circular diameter" (ECD) is used to define the diameter of a circle having the same projected area as a silver halide grain.

The term "aspect ratio" is used to define the ratio of grain ECD to grain thickness.

The term "coefficient of variation" (COV) is defined as 100 times the standard deviation (a) of grain ECD divided by the mean grain ECD.

The term "covering power" is used to indicate 100 times the ratio of maximum density to developed silver measured in mg/$dm^2$.

The term "dual-coated" is used to define a radiographic film having silver halide emulsion layers disposed on both the front and backsides of the support. The radiographic silver halide films used in the present invention are "dual-coated."

The term "exposure latitude" refers to the width of the gamma/log E curves for which contrast values were greater than 1.5.

The term "dynamic range" refers to the range of exposures over which useful images can be obtained (usually having a gamma greater than 2).

The units "kVp" and "MVp" stand for peak voltage applied to an X-ray tube times $10^3$ and $10^6$, respectively.

The term "fluorescent intensifying screen" refers to a screen that absorbs X-radiation and emits light. A "prompt"

emitting fluorescent intensifying screen will emit light immediately upon exposure to radiation while a "storage" fluorescent screen can "store" the exposing X-radiation for emission at a later time when the screen is irradiated with other radiation (usually visible light). The screens useful in the practice of the present invention are "prompt" emitting fluorescent intensifying screens.

The terms "front" and "back" refer to layers, films, or fluorescent intensifying screens nearer to and farther from, respectively, the source of X-radiation.

The term "rare earth" is used to indicate chemical elements having an atomic number of 39 or 57 through 71.

*Research Disclosure* is published by Kenneth Mason Publications, Ltd., Dudley House, 12 North St., Emsworth, Hampshire P010 7DQ England. This publication is also available from Emsworth Design Inc., 147 West 24th Street, New York, N.Y. 10011.

The radiographic silver halide films useful in this invention include a flexible support having disposed on both sides thereof, one or more photographic silver halide emulsion layers and optionally one or more non-radiation sensitive hydrophilic layer(s).

In preferred embodiments, the photographic silver halide film has a protective overcoat (described below) over all of the layers on each side of the support.

The support can take the form of any conventional radiographic film support that is X-radiation and light transmissive. Useful supports for the films of this invention can be chosen from among those described in *Research Disclosure*, September 1996, Item 38957 XV. Supports and *Research Disclosure*, Vol. 184, August 1979, Item 18431, XII. Film Supports.

The support is preferably a transparent film support. In its simplest possible form the transparent film support consists of a transparent film chosen to allow direct adhesion of the hydrophilic silver halide emulsion layers or other hydrophilic layers. More commonly, the transparent film is itself hydrophobic and subbing layers are coated on the film to facilitate adhesion of the hydrophilic silver halide emulsion layers. Typically the film support is either colorless or blue tinted (tinting dye being present in one or both of the support film and the subbing layers). Referring to *Research Disclosure*, Item 38957, Section XV Supports, cited above, attention is directed particularly to paragraph (2) that describes subbing layers, and paragraph (7) that describes preferred polyester film supports.

Polyethylene terephthalate and polyethylene naphthalate are the preferred transparent film support materials.

In the more preferred embodiments, at least one non-light sensitive hydrophilic layer is included with the one or more silver halide emulsion layers on each side of the film support. This layer may be called an interlayer or overcoat, or both.

The "frontside" of the support comprises one or more silver halide emulsion layers, at least one of which contains predominantly cubic grains (that is, more than 50 weight % of all grains). These cubic silver halide grains include predominantly (at least 78.5 mol %) bromide, and up to 98.75 mol % bromide, based on total silver in the cubic grain silver halide emulsion layer. In addition, these cubic grains must have from about 1 to about 20 mol % chloride (preferably from about 10 to about 20 mol % chloride) and from about 0.25 to about 1.5 mol % iodide (preferably from about 0.5 to about 1 mol % iodide), based on total silver in this cubic grain emulsion layer. The cubic silver halide grains in each silver halide emulsion unit (or silver halide emulsion layers) can be the same or different.

The amount of chloride in the cubic silver halide grains is critical to provide desired processability and image tone while the amount of iodide is critical to provide desired photographic speed. Too much chloride results in poor absorption of spectral sensitizing dyes to the grains.

The average silver halide grain size can vary within each radiographic silver halide film, and within each emulsion layer within that film. For example, the average grain size in each cubic grain silver halide emulsion layer is generally from about 0.65 to about 0.8 $\mu$m (preferably from about 0.72 to about 0.76 $\mu$m), but the average grain size can be different in the various other emulsion layers.

The non-cubic silver halide grains (if present) in the cubic grain emulsion layers can have any desirable morphology including, but not limited to, octahedral, tetradecahedral, rounded, spherical or other non-tabular morphologies, or be comprised of a mixture of two or more of such morphologies.

As noted above, it is essential that at least one of the cubic grain silver halide emulsion layers comprise a combination of one or more first spectral sensitizing dyes and one or more second spectral sensitizing dyes that provide a combined J-aggregate absorption within the range of from about 540 to about 560 nm (preferably from about 545 to about 555 nm) when absorbed on the cubic silver halide grains. The one or more first spectral sensitizing dyes are anionic benzimidazole-benzoxazole carbocyanines and the one or more second spectral sensitizing dyes are anionic oxycarbocyanines.

Preferably, all cubic grain silver halide emulsions in the film contain one or more of these combinations of spectral sensitizing dyes. The combinations of dyes can be the same of different in each cubic grain silver halide emulsion layer. A most preferred combination of spectral sensitizing dyes A-2 and B-1 identified below has a combined J-aggregate absorption $\lambda_{max}$ of about 552 nm when absorbed to cubic silver halide grains.

The first and second spectral sensitizing dyes are provided on the cubic silver halide grains in a molar ratio of one or more first spectral sensitizing dyes to one or more second spectral sensitizing dyes of from about 0.25:1 to about 4:1, preferably at a molar ratio of from about 0.5:1 to about 1.5:1, and more preferably at a molar ratio of from about 0.75:1 to about 1.25:1. A most preferred combination of spectral sensitizing dyes A-2 and B-1 identified below is a molar ratio of 1:1. The useful total amounts of the first and second dyes in a given cubic grain silver halide emulsion layer are generally and independently within the range of from about 0.1 to about 1 mmol/mole of silver in the emulsion layer. Optimum amounts will vary with the particular dyes used and a skilled worker in the art would understand how to achieve optimal benefit with the combination of dyes in appropriate amounts. The total amount of both dyes is generally from about 0.25 to about 0.75 mmol/mole of silver.

Preferred "first" spectral sensitizing dyes can be represented by the following Structure I, and preferred "second" spectral sensitizing dyes can be represented by the following Structure II.

I

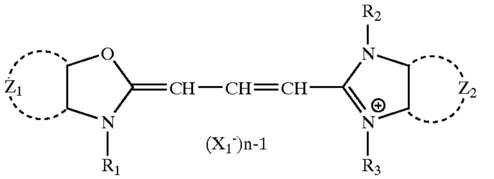

II

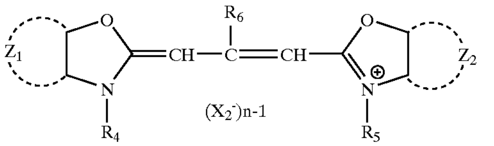

In both Structure I and II, $Z_1$ and $Z_2$ are independently the carbon atoms that are necessary to form a substituted or unsubstituted benzene or naphthalene ring. Preferably, each of $Z_1$ and $Z_2$ independently represent the carbon atoms necessary to form a substituted or unsubstituted benzene ring.

$X_1^-$ and $X_2^-$ are independently anions such as halides, thiocyanate, sulfate, perchlorate, p-toluene sulfonate, ethyl sulfate, and other anions readily apparent to one skilled in the art. In addition, "n" is 1 or 2, and it is 1 when the compound is an intermolecular salt.

In Structure I, $R_1$, $R_2$, and $R_3$ are independently alkyl groups having 1 to 10 carbon atoms, alkoxy groups having 1 to 10 carbon atoms, aryl groups having 6 to 10 carbon atoms in the aromatic ring, alkenyl groups having 2 to 8 carbon atoms, and other substituents that would be readily apparent to one skilled in the art. Such groups can be substituted with one or more hydroxy, alkyl, carboxy, sulfo, halo, and alkoxy groups. Preferably, at least one of the $R_1$, $R_2$, and $R_3$ groups comprises at least one sulfo or carboxy group.

Preferably, $R_1$, $R_2$, and $R_3$ are independently alkyl groups having 1 to 4 carbon atoms, phenyl groups, alkoxy groups having 1 to 4 carbon atoms, or alkenyl groups having 2 to 4 carbon atoms. All of these groups can be substituted as described above, and in particular, they can be substituted with a sulfo or carboxy group.

In Structure II, $F_4$ and $R_5$ are independently defined as noted above for $R_1$, $R_2$, and $R_3$. $R_6$ is hydrogen, an alkyl group having 1 to 4 carbon atoms, or a phenyl group, each of which groups can be substituted as described above for the other radicals.

Further details of such spectral sensitizing dyes are provided in U.S. Pat. No. 4,659,654 (Metoki et al.), incorporated herein by reference. These dyes can be readily prepared using known synthetic methods, as described for example in Hamer, *Cyanine Dyes and Related Compounds*, John Wiley & Sons, 1964, incorporated herein by reference.

Representative "first" spectral sensitizing dyes useful in the practice of this invention include the following Compounds A-1 to A-7:

A-1

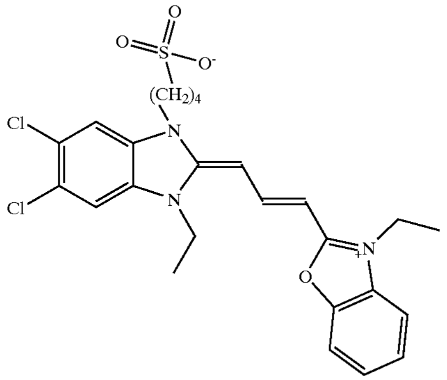

A-2

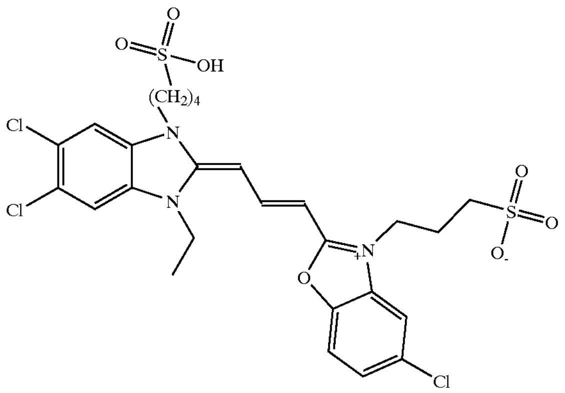

A-3

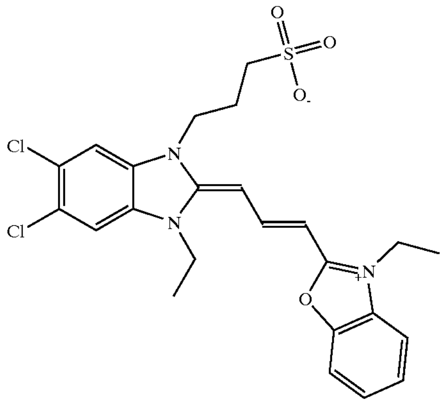

A-4

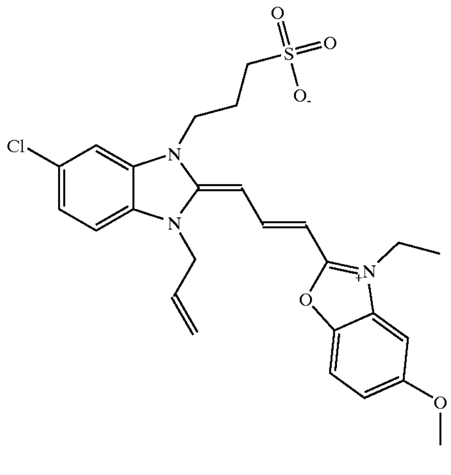

-continued
A-5
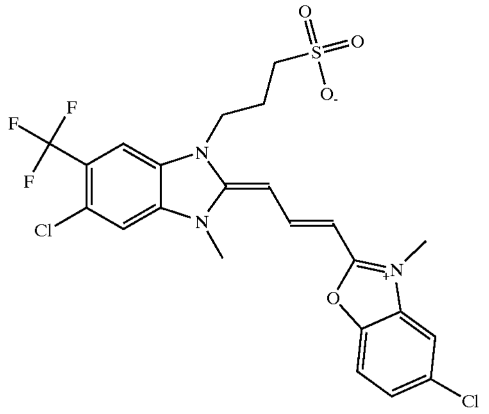
A-6
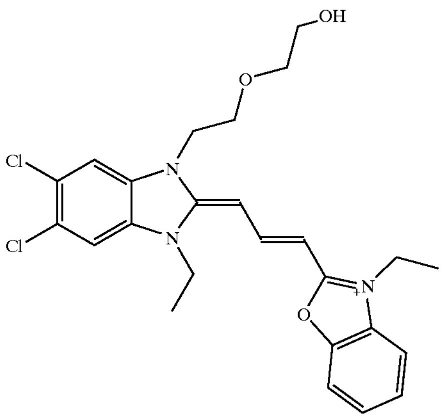
A-7
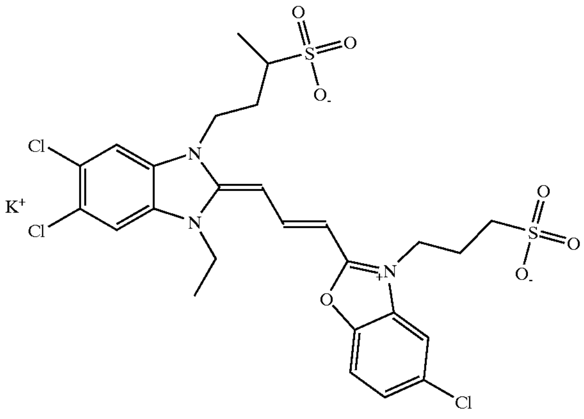
Representative "second" spectral sensitizing dyes useful in the practice of this invention include the following Compounds B-1 to B-5:
B-1
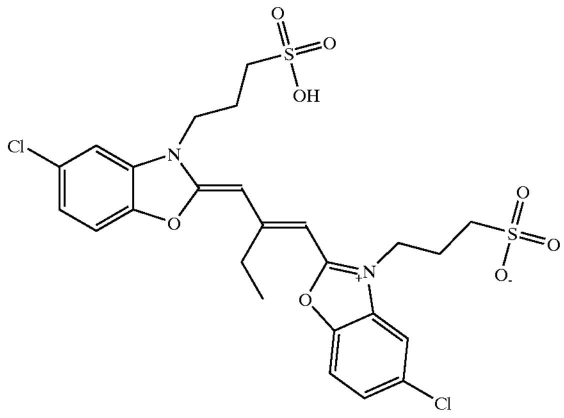
B-2
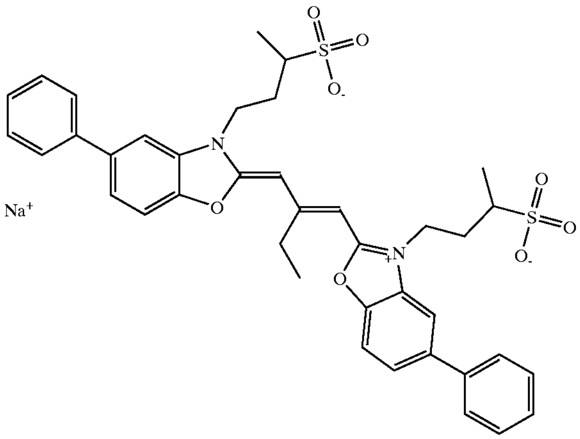
B-3
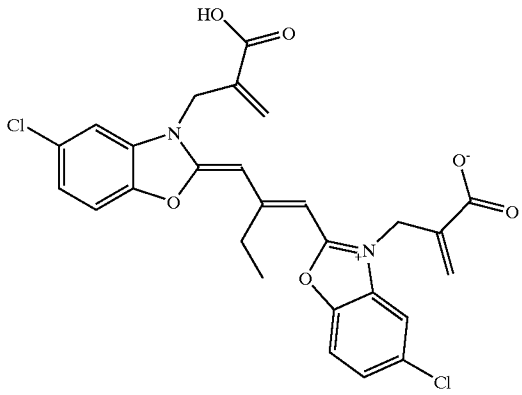
B-4
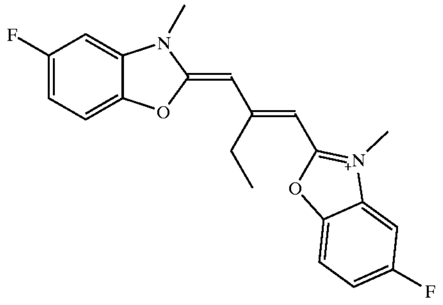

-continued

B-5

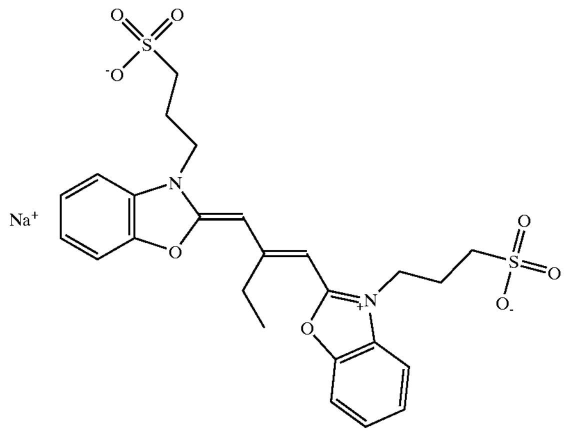

Another essential feature of the radiographic film useful in this invention is the presence of one or more hexacoordination complex compounds as silver halide dopants in the cubic silver halide grains of one or more cubic grain emulsions. Preferably, only the cubic grains on the frontside of the film are doped with hexacoordination complex compounds. The term "dopant" is well known in photographic chemistry and generally refers to a compound that includes a metal ion that displaces silver in the crystal lattice of the silver halide grain, exhibits a positive valence of from 2 to 5, has its highest energy electron occupied molecular orbital filled and its lowest energy unoccupied molecular orbital at an energy level higher than the lowest energy conduction band of the silver halide crystal lattice forming the protrusions.

The hexacoordination complex compounds particularly useful in the practice of this invention are represented by the following Structure I:

$$[ML_6]^n$$

wherein M is a Group VIII polyvalent transition metal ion, L represents six coordination complex ligands that can be the same or different provided that at least four of the ligands are anionic ligands and at least one (preferably at least 3) of the ligands is more electronegative than any halide ligand, and n is −2, −3, or −4. Preferably, n is −3 or −4.

Examples of M include but are not limited to, $Fe^{+2}$, $Ru^{+2}$, $Os^{+2}$, $Co^{+3}$, $Rh^{+3}$, $Ir^{+3}$, $Pd^{+3}$, and $Pt^{+4}$, and preferably M is $Ru^{+2}$. Examples of useful coordination complex ligands include but are not limited to, cyanide, pyrazine, chloride, iodide, bromide, oxycyanide, water, oxalate, thiocyanide, and carbon monoxide. Cyanide is a preferred coordination complex ligand.

Particularly useful dopants are ruthenium coordination complexes comprising at least 4 and more preferably 6 cyanide coordination complex ligands.

Mixtures of dopants described above can also be used.

The metal dopants can be introduced during emulsion precipitation using procedures well known in the art. They can be present in the dispersing medium present in the reaction vessel before grain nucleation. More typically, the metal coordination complexes are introduced at least in part during precipitation through one of the halide ion or silver ion jets or through a separate jet. Such procedures are described in U.S. Pat. No. 4,933,272 (McDugle et al.) and U.S. Pat. No. 5,360,712 (Olm et al.), both incorporated herein by reference, and references cited therein.

While some dopants in the art are distributed uniformly throughout 100% of the volume of the silver halide grains, it is desired in the practice of this invention to provide the dopant in only a part of the grain volume, generally within 95% and preferably within 90% of the innermost volume from the center of the cubic silver halide grains. Methods for doing this are known in the art, for example is described in U.S. Pat. No. 4,933,272 and U.S. Pat. No. 5,360,712 (both noted above).

In other embodiments, the dopants are uniformly distributed in "bands" of the silver halide grains, for example, within a band that is from about 50 to about 80 innermost volume % (preferably from about 75 to about 80 innermost volume % for ruthenium hexacoordination complex compounds) from the center or core of the cubic silver halide grains. One skilled in the art would readily know how to achieve these results by planned addition of the doping compounds during only a portion of the process used to prepare the silver halide. A particularly useful method of "doping" such grains is described in copending and commonly assigned U.S. Ser. No. 10/299,475 filed on even date herewith by Adin et al.

It is also desired that the one or more dopants be present within the cubic grains in an amount of at least $1\times10^{-6}$ mole, preferably from about $1\times10^{-6}$ to about $5\times10^{-4}$ mole, and more preferably from about $1\times10^{-5}$ to about $5\times10^{-4}$ mole, per mole of silver in the cubic grain emulsion layer.

The backside of the support also includes one or more silver halide emulsion layers, preferably at least one of which comprises tabular silver halide grains. Generally, at least 50% (and preferably at least 80%) of the silver halide grain projected area in this silver halide emulsion layer is provided by tabular grains having an average aspect ratio greater than 5, and more preferably greater than 10. The remainder of the silver halide projected area is provided by silver halide grains having one or more non-tabular morphologies. In addition, the tabular grains are predominantly (at least 90 mol %) bromide based on the total silver in the emulsion layer and can include up to 1 mol % iodide. Preferably, the tabular grains are pure silver bromide.

Tabular grain emulsions that have the desired composition and sizes are described in greater detail in the following patents, the disclosures of which are incorporated herein by reference:

U.S. Pat. No. 4,414,310 (Dickerson), U.S. Pat. No. 4,425,425 (Abbott et al.), U.S. Pat. No. 4,425,426 (Abbott et al.), U.S. Pat. No. 4,439,520 (Kofron et al.), U.S. Pat. No. 4,434,226 (Wilgus et al.), U.S. Pat. No. 4,435,501 (Maskasky), U.S. Pat. No. 4,713,320 (Maskasky), U.S. Pat. No. 4,803,150 (Dickerson et al.), U.S. Pat. No. 4,900,355 (Dickerson et al.), U.S. Pat. No. 4,994,355 (Dickerson et al.), U.S. Pat. No. 4,997,750 (Dickerson et al.), U.S. Pat. No. 5,021,327 (Bunch et al.), U.S. Pat. No. 5,147,771 (Tsaur et al.), U.S. Pat. No. 5,147,772 (Tsaur et al.), U.S. Pat. No. 5,147,773 (Tsaur et al.), U.S. Pat. No. 5,171,659 (Tsaur et al.), U.S. Pat. No. 5,252,442 (Dickerson et al.), U.S. Pat. No. 5,370,977 (Zietlow), U.S. Pat. No. 5,391,469 (Dickerson), U.S. Pat. No. 5,399,470 (Dickerson et al.), U.S. Pat. No. 5,411,853 (Maskasky), U.S. Pat. No. 5,418,125 (Maskasky), U.S. Pat. No. 5,494,789 (Daubendiek et al.), U.S. Pat. No. 5,503,970 (Olm et al.), U.S. Pat. No. 5,536,632 (Wen et al.), U.S. Pat. No. 5,518,872 (King et al.), U.S. Pat. No. 5,567,580 (Fenton et al.), U.S. Pat. No. 5,573,902 (Daubendiek et al.), U.S. Pat. No. 5,576,156 (Dickerson), U.S. Pat. No. 5,576,168 (Daubendiek et al.), U.S. Pat. No. 5,576,171 (Olm et al.), and U.S. Pat. No. 5,582,965 (Deaton et al.). The patents to Abbott et al., Fenton et al., Dickerson, and Dickerson et al. are also cited and incorporated herein to show conventional radiographic film features in addition to gelatino-vehicle, high bromide (≧80 mol % bromide based on total silver) tabular grain emulsions and other features useful in the present invention.

The backside ("second major support surface") of the radiographic silver halide film also preferably includes an antihalation layer disposed over the silver halide emulsion layer(s). This layer comprises one or more antihalation dyes or pigments dispersed on a suitable hydrophilic binder (described below). In general, such antihalation dyes or pigments are chosen to absorb whatever radiation the film is likely to be exposed to from a fluorescent intensifying screen. For example, pigments and dyes that can be used as antihalation pigments or dyes include various water-soluble, liquid crystalline, or particulate magenta or yellow filter dyes or pigments including those described for example in U.S. Pat. No. 4,803,150 (Dickerson et al.), U.S. Pat. No. 5,213,956 (Diehl et al.), U.S. Pat. No. 5,399,690 (Diehl et al.), U.S. Pat. No. 5,922,523 (Helber et al.), U.S. Pat. No. 6,214,499 (Helber et al.), and Japanese Kokai 2-123349, all of which are incorporated herein by reference for pigments and dyes useful in the practice of this invention. One useful class of particulate antihalation dyes includes nonionic polymethine dyes such as merocyanine, oxonol, hemioxonol, styryl, and arylidene dyes as described in U.S. Pat. No. 4,803,150 (noted above) that is incorporated herein for the definitions of those dyes. The magenta merocyanine and oxonol dyes are preferred and the oxonol dyes are most preferred.

The amounts of such dyes or pigments in the antihalation layer are generally from about 1 to about 2 mg/dm$^2$. A particularly useful antihalation dye is the magenta filter dye M-1 identified as follows:

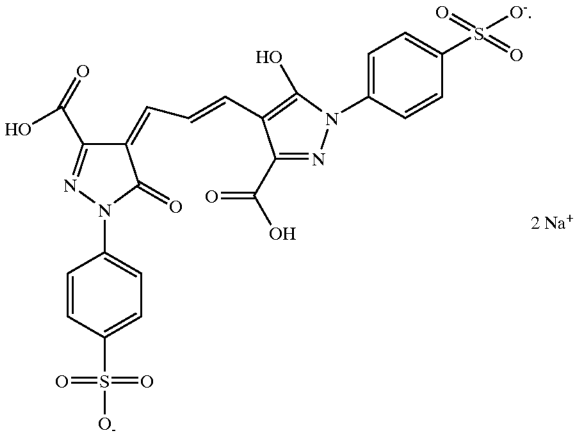

A general summary of silver halide emulsions and their preparation is provided by *Research Disclosure*, Item 38957, cited above, Section I. Emulsion grains and their preparation. After precipitation and before chemical sensitization the emulsions can be washed by any convenient conventional technique using techniques disclosed by *Research Disclosure*, Item 38957, cited above, Section III. Emulsion washing.

The emulsions can be chemically sensitized by any convenient conventional technique as illustrated by *Research Disclosure*, Item 38957, Section IV. Chemical Sensitization: Sulfur, selenium or gold sensitization (or any combination thereof) are specifically contemplated. Sulfur sensitization is preferred, and can be carried out using for example, thiosulfates, thiosulfonates, thiocyanates, isothiocyanates, thioethers, thioureas, cysteine or rhodanine. A combination of gold and sulfur sensitization is most preferred.

Instability that increases minimum density in negative-type emulsion coatings (that is fog) can be protected against by incorporation of stabilizers, antifoggants, antikinking agents, latent-image stabilizers and similar addenda in the emulsion and contiguous layers prior to coating. Such addenda are illustrated by *Research Disclosure*, Item 38957, Section VII. Antifoggants and stabilizers, and Item 18431, Section II: Emulsion Stabilizers, Antifoggants and Antikinking Agents.

It may also be desirable that one or more silver halide emulsion layers include one or more covering power enhancing compounds adsorbed to surfaces of the silver halide grains. A number of such materials are known in the art, but preferred covering power enhancing compounds contain at least one divalent sulfur atom that can take the form of a —S— or =S moiety. Such compounds include, but are not limited to, 5-mercapotetrazoles, dithioxotriazoles, mercapto-substituted tetraazaindenes, and others described in U.S. Pat. No. 5,800,976 (Dickerson et al.) that is incorporated herein by reference for the teaching of the sulfur-containing covering power enhancing compounds.

The silver halide emulsion layers and other hydrophilic layers on both sides of the support of the radiographic films generally contain conventional polymer vehicles (peptizers and binders) that include both synthetically prepared and naturally occurring colloids or polymers. The most preferred polymer vehicles include gelatin or gelatin derivatives alone or in combination with other vehicles. Conventional gelatino-vehicles and related layer features are disclosed in *Research Disclosure*, Item 38957, Section II. Vehicles, vehicle extenders, vehicle-like addenda and vehicle related addenda. The emulsions themselves can contain peptizers of the type set out in Section II, paragraph A. Gelatin and hydrophilic colloid peptizers. The hydrophilic colloid peptizers are also useful as binders and hence are commonly present in much higher concentrations than required to perform the peptizing function alone. The preferred gelatin vehicles include alkali-treated gelatin, acid-treated gelatin or gelatin derivatives (such as acetylated gelatin, deionized gelatin, oxidized gelatin and phthalated gelatin). Cationic starch used as a peptizer for tabular grains is described in U.S. Pat. No. 5,620,840 (Maskasky) and U.S. Pat. No. 5,667,955 (Maskasky). Both hydrophobic and hydrophilic synthetic polymeric vehicles can be used also. Such materials include, but are not limited to, polyacrylates (including polymethacrylates), polystyrenes and polyacrylamides (including polymethacrylamides). Dextrans can also be used. Examples of such materials are described for example in U.S. Pat. No. 5,876,913 (Dickerson et al.), incorporated herein by reference.

The silver halide emulsion layers (and other hydrophilic layers) in the radiographic films are generally fully hardened using one or more conventional hardeners. Thus, the amount of hardener in each silver halide emulsion and other hydrophilic layer is generally at least 2% and preferably at least 2.5%, based on the total dry weight of the polymer vehicle in each layer (unless otherwise stated herein).

Conventional hardeners can be used for this purpose, including but not limited to formaldehyde and free dialdehydes such as succinaldehyde and glutaraldehyde, blocked dialdehydes, α-diketones, active esters, sulfonate esters, active halogen compounds, s-triazines and diazines, epoxides, aziridines, active olefins having two or more active bonds, blocked active olefins, carbodiimides, isoxazolium salts unsubstituted in the 3-position, esters of 2-alkoxy-N-carboxydihydroquinoline, N-carbamoyl pyridinium salts, carbamoyl oxypyridinium salts, bis(amidino) ether salts, particularly bis(amidino) ether salts, surface-applied carboxyl-activating hardeners in combination with complex-forming salts, carbamoylonium, carbamoyl pyridinium and carbamoyl oxypyridinium salts in combination with certain aldehyde scavengers, dication ethers, hydroxylamine esters of imidic acid salts and chloroformamidinium salts, hardeners of mixed function such as halogen-substituted aldehyde acids (for example, mucochloric and mucobromic acids), onium-substituted acroleins, vinyl sulfones containing other hardening functional groups, polymeric hardeners such as dialdehyde starches, and poly (acrolein-co-methacrylic acid).

An essential feature of the films used in this invention is the presence of a mixture of hydrophilic binders in at least one of the cubic silver halide grain emulsions on the frontside of the films of this invention. This mixture of hydrophilic binders includes gelatin or a gelatin derivative (as defined above) as a "first" binder (or a mixture of gelatin and gelatin derivatives), and a "second" hydrophilic binder (or mixture thereof) that is not gelatin or a gelatin derivative. Preferably, this mixture of binders is present in the frontside cubic grain silver halide emulsion layer that also includes the mixture of first and second spectral sensitizing dyes, the hexacoordination complex compounds as dopants, and the unique combination of silver bromide, silver iodide, and silver chloride in the cubic grains described above.

Useful "second" hydrophilic binders include, but are not limited to, polyacrylates (including polymethacrylates), polystyrenes and polyacrylamides (including polymethacrylamides), dextrans, and various polysaccharides. Examples of such materials are described for example in U.S. Pat. No. 5,876,913 (Dickerson et al.), incorporated herein by reference. The dextrans are preferred.

The weight ratio of first hydrophilic binder (or mixture thereof) to second hydrophilic binder (or mixture thereof) in the cubic grain silver halide emulsion layer is from about 2:1 to about 5:1. Preferably, this weight ratio is from about 2.5:1 to about 3.5:1. A most preferred weight ratio is about 3:1.

The cubic grain silver halide emulsion layers in the radiographic films are generally hardened to various degrees using one or more conventional hardeners. Conventional hardeners can be used for this purpose, including but not limited to those described above.

The cubic grain silver halide emulsion layer comprising the mixture of first and second binders includes a critical amount of one or more hardeners that is at least 0.4 weight % based on the total binder weight in that emulsion layer. Preferably, the amount of hardener in that emulsion layer is from about 0.5 to about 1.5 weight % and a most preferred amount is about 1 weight %. While any of the noted conventional hardeners can be used, the preferred hardeners include bisvinylsulfonylmethylether and bisvinylsulfonylmethane.

The levels of silver and polymer vehicle in the radiographic silver halide film used in the present invention are not critical. In general, the total amount of silver on each side of each film is at least 10 and no more than 55 $mg/dm^2$ in one or more emulsion layers. In addition, the total amount of polymer vehicle on each side of each film is generally at least 35 and no more than 45 $mg/dm^2$ in one or more hydrophilic layers. The amounts of silver and polymer vehicle on the two sides of the support in the radiographic silver halide film can be the same or different. Preferably, the amounts are different. These amounts refer to dry weights.

The radiographic silver halide films useful in this invention generally include a surface protective overcoat on each side of the support that typically provides physical protection of the emulsion and other hydrophilic layers. Each protective overcoat can be sub-divided into two or more individual layers. For example, protective overcoats can be sub-divided into surface overcoats and interlayers (between the overcoat and silver halide emulsion layers). In addition to vehicle features discussed above the protective overcoats can contain various addenda to modify the physical properties of the overcoats. Such addenda are illustrated by *Research Disclosure*, Item 38957, Section IX. Coating physical property modifying addenda, A. Coating aids, B. Plasticizers and lubricants, C. Antistats, and D. Matting agents. Interlayers that are typically thin hydrophilic colloid layers can be used to provide a separation between the emulsion layers and the surface overcoats. The overcoat on at least one side of the support can also include a blue toning dye or a tetraazaindene (such as 4-hydroxy-6-methyl-1,3,3a,7-tetraazaindene) if desired.

The protective overcoat is generally comprised of one or more hydrophilic colloid vehicles, chosen from among the same types disclosed above in connection with the emulsion layers. Protective overcoats are provided to perform two basic functions. They provide a layer between the emulsion layers and the surface of the film for physical protection of the emulsion layer during handling and processing. Secondly, they provide a convenient location for the placement of addenda, particularly those that are intended to modify the physical properties of the radiographic film. The protective overcoats of the films can perform both these basic functions.

The various coated layers of radiographic silver halide films used in this invention can also contain tinting dyes to modify the image tone to transmitted or reflected light. These dyes are not decolorized during processing and may be homogeneously or heterogeneously dispersed in the various layers. Preferably, such non-bleachable tinting dyes are in a silver halide emulsion layer.

The radiographic imaging assemblies useful in the present invention are composed of one radiographic silver halide film as described herein and one or more fluorescent intensifying screens. Preferably, the imaging assembly includes a single fluorescent intensifying screen. Fluorescent intensifying screens are typically designed to absorb X-rays and to emit electromagnetic radiation having a wavelength greater than 300 nm. These screens can take any convenient form providing they meet all of the usual requirements for use in radiographic imaging. Examples of conventional, useful fluorescent intensifying screens and methods of making them are provided by *Research Disclosure*, Item 18431, cited above, Section IX. X-Ray Screens/Phosphors, and U.S. Pat. No. 5,021,327 (Bunch et al.), U.S. Pat. No. 4,994,355 (Dickerson et al.), U.S. Pat. No. 4,997,750 (Dickerson et al.), and U.S. Pat. No. 5,108,881 (Dickerson et al.), the disclosures of which are here incorporated by reference. The fluorescent layer contains phosphor particles and a binder, optimally additionally containing a light scattering material, such as titania or light absorbing materials such as particulate carbon, dyes or pigments. Any conventional binder (or mixture thereof) can be used but preferably the binder is an aliphatic polyurethane elastomer or another highly transparent elastomeric polymer.

Any conventional or useful phosphor can be used, singly or in mixtures, in the intensifying screens used in the practice of this invention. For example, useful phosphors are described in numerous references relating to fluorescent intensifying screens, including but not limited to, *Research Disclosure*, Vol. 184, August 1979, Item 18431, Section IX, X-ray Screens/Phosphors, and U.S. Pat. No. 2,303,942 (Wynd et al.), U.S. Pat. No. 3,778,615 (Luckey), U.S. Pat. No. 4,032,471 (Luckey), U.S. Pat. No. 4,225,653 (Brixner et al.), U.S. Pat. No. 3,418,246 (Royce), U.S. Pat. No. 3,428,247 (Yocon), U.S. Pat. No. 3,725,704 (Buchanan et al.), U.S. Pat. No. 2,725,704 (Swindells), U.S. Pat. No. 3,617,743 (Rabatin), U.S. Pat. No. 3,974,389 (Ferri et al.), U.S. Pat. No. 3,591,516 (Rabatin), U.S. Pat. No. 3,607,770 (Rabatin), U.S. Pat. No. 3,666,676 (Rabatin), U.S. Pat. No. 3,795,814 (Rabatin), U.S. Pat. No. 4,405,691 (Yale), U.S. Pat. No. 4,311,487 (Luckey et al.), U.S. Pat. No. 4,387,141 (Patten), U.S. Pat. No. 5,021,327 (Bunch et al.), U.S. Pat. No. 4,865,944 (Roberts et al.), U.S. Pat. No. 4,994,355 (Dickerson et al.), U.S. Pat. No. 4,997,750 (Dickerson et al.), U.S. Pat. No. 5,064,729 (Zegarski), U.S. Pat. No. 5,108,881 (Dickerson et al.), U.S. Pat. No. 5,250,366 (Nakajima et al.), U.S. Pat. No. 5,871,892 (Dickerson et al.), EP-A-0 491,116 (Benzo et al.), the disclosures of all of which are incorporated herein by reference with respect to the phosphors.

Useful classes of phosphors include, but are not limited to, calcium tungstate ($CaWO_4$), activated or unactivated lithium stannates, niobium and/or rare earth activated or unactivated yttrium, lutetium, or gadolinium tantalates, rare earth (such as terbium, lanthanum, gadolinium, cerium, and lutetium)-activated or unactivated middle chalcogen phosphors such as rare earth oxychalcogenides and oxyhalides, and terbium-activated or unactivated lanthanum and lutetium middle chalcogen phosphors.

Still other useful phosphors are those containing hafnium as described for example in U.S. Pat. No. 4,988,880 (Bryan et al.), U.S. Pat. No. 4,988,881 (Bryan et al.), U.S. Pat. No. 4,994,205 (Bryan et al.), U.S. Pat. No. 5,095,218 (Bryan et al.), U.S. Pat. No. 5,112,700 (Lambert et al.), U.S. Pat. No. 5,124,072 (Dole et al.), and U.S. Pat. No. 5,336,893 (Smith et al.), the disclosures of which are all incorporated herein by reference.

Some preferred rare earth oxychalcogenide and oxyhalide phosphors are represented by the following formula (1):

$$M'_{(w-n)}M''_nO_wX' \qquad (1)$$

wherein M' is at least one of the metals yttrium (Y), lanthanum (La), gadolinium (Gd), or lutetium (Lu), M'' is at least one of the rare earth metals, preferably dysprosium (Dy), erbium (Er), europium (Eu), holmium (Ho), neodymium (Nd), praseodymium (Pr), samarium (Sm), tantalum (Ta), terbium (Th), thulium (Tm), or ytterbium (Yb), X' is a middle chalcogen (S, Se, or Te) or halogen, n is 0.002 to 0.2, and w is 1 when X' is halogen or 2 when X' is a middle chalcogen. These include rare earth-activated lanthanum oxybromides, and terbium-activated or thulium-activated gadolinium oxides such as $Gd_2O_2S$:Tb.

Other suitable phosphors are described in U.S. Pat. No. 4,835,397 (Arakawa et al.) and U.S. Pat. No. 5,381,015 (Dooms), both incorporated herein by reference, and including for example divalent europium and other rare earth activated alkaline earth metal halide phosphors and rare earth element activated rare earth oxyhalide phosphors. Of these types of phosphors, the more preferred phosphors include alkaline earth metal fluorohalide prompt emitting and/or storage phosphors [particularly those containing iodide such as alkaline earth metal fluorobromoiodide storage phosphors as described in U.S. Pat. No. 5,464,568 (Bringley et al.), incorporated herein by reference].

Another class of useful phosphors includes rare earth hosts such as rare earth activated mixed alkaline earth metal sulfates such as europium-activated barium strontium sulfate.

Particularly useful phosphors are those containing doped or undoped tantalum such as $YTaO_4$, $YTaO_4$:Nb, Y(Sr)$TaO_4$, and Y(Sr)$TaO_4$:Nb. These phosphors are described in U.S. Pat. No. 4,226,653 (Brixner), U.S. Pat. No. 5,064,729 (Zegarski), U.S. Pat. No. 5,250,366 (Nakajima et al.), and U.S. Pat. No. 5,626,957 (Benso et al.), all incorporated herein by reference.

Other useful phosphors are alkaline earth metal phosphors that can be the products of firing starting materials comprising optional oxide and a combination of species characterized by the following formula (2):

$$MFX_{1-z}I_zuM^aX^a{:}yA{:}eQ{:}tD \qquad (2)$$

wherein "M" is magnesium (Mg), calcium (Ca), strontium (Sr), or barium (Ba), "F" is fluoride, "X" is chloride (Cl) or bromide (Br), "I" is iodide, $M^a$ is sodium (Na), potassium (K), rubidium (Rb), or cesium (Cs), $X^a$ is fluoride (F), chloride (Cl), bromide (Br), or iodide (I), "A" is europium (Eu), cerium (Ce), samarium (Sm), or terbium (Th), "Q" is BeO, MgO, CaO, SrO, BaO, ZnO, $Al_2O_3$, $La_2O_3$, $In_2O_3$, $SiO_2$, $TiO_2$, $ZrO_2$, $GeO_2$, $SnO_2$, $Nb_2O_5$, $Ta_2O_5$, or $ThO_2$, "D" is vanadium (V), chromium (Cr), manganese (Mn), iron (Fe), cobalt (Co), or nickel (Ni). The numbers in the noted formula are the following: "z" is 0 to 1, "u" is from 0 to 1, "y" is from $1\times10^{-4}$ to 0.1, "e" is form 0 to 1, and "t" is from 0 to 0.01. These definitions apply wherever they are found in this application unless specifically stated to the contrary. It is also contemplated that "M", "X", "A", and "D" represent multiple elements in the groups identified above.

Some fluorescent intensifying screens useful in the practice of this invention have as a phosphor, a gadolinium oxysulfide:terbium. Moreover, the particle size distribution of the phosphor particles is an important factor in determining the speed and sharpness of the screen. For example, at least 50% of the particles have a size of less than 3 μm and 85% of the particles have a size of less than 5.5 μm. In addition, the coverage of phosphor in the dried layer is from about 260 to about 380 $g/m^2$, and preferably from about 290 to about 350 $g/m^2$.

Flexible support materials for radiographic screens in accordance with the present invention include cardboard, plastic films such as films of cellulose acetate, polyvinyl chloride, polyvinyl acetate, polyacrylonitrile, polystyrene, polyester, polyethylene terephthalate, polyamide, polyimide, cellulose triacetate and polycarbonate, metal sheets such as aluminum foil and aluminum alloy foil, ordinary papers, baryta paper, resin-coated papers, pigmented papers containing titanium dioxide or the like, and papers sized with polyvinyl alcohol or the like. A plastic film is preferably employed as the support material.

The plastic film support may contain a light-absorbing material such as carbon black, or may contain a light-reflecting material such as titanium dioxide or barium sulfate. The former is appropriate for preparing a high-resolution type radiographic screen, while the latter is appropriate for preparing a high-sensitivity type radiographic screen. For use in this invention it is highly preferred that the support absorb substantially all of the radiation emitted by the phosphor. Examples of particularly preferred supports include polyethylene terephthalate, blue colored or black colored (for example, LUMIRROR C, type X30 supplied by Toray Industries, Tokyo, Japan).

These supports may have a thickness that may differ depending on the material of the support, and may generally be between 60 and 1000 μm, more preferably between 80 and 500 μm from the standpoint of handling.

A representative fluorescent intensifying screen useful in the present invention is described in the example below.

An embodiment useful in the present invention is illustrated in FIG. 1. In reference to the imaging assembly 10 shown in FIG. 1, fluorescent intensifying screen 20 is arranged in association with radiographic silver halide film 30 in cassette holder 40.

Exposure and processing of the radiographic silver halide films can be undertaken in any convenient conventional manner. The exposure and processing techniques of U.S. Pat. No. 5,021,327 and U.S. Pat. No. 5,576,156 (both noted above) are typical for processing radiographic films. Other processing compositions (both developing and fixing compositions) are described in U.S. Pat. No. 5,738,979 (Fitterman et al.), U.S. Pat. No. 5,866,309 (Fitterman et al.), U.S. Pat. No. 5,871,890 (Fitterman et al.), U.S. Pat. No. 5,935,770 (Fitterman et al.), U.S. Pat. No. 5,942,378 (Fitterman et al.), all incorporated herein by reference. The processing compositions can be supplied as single- or multi-part formulations, and in concentrated form or as more diluted working strength solutions.

Exposing X-radiation is generally directed through a fluorescent intensifying screen before it passes through the radiographic silver halide film for imaging soft tissue such as breast tissue. Imaging radiation is generated in conventional radiographic imaging equipment in which a peak voltage greater than 28 kVp can be generated. Preferably, the peak voltage is 30 kVp or more. In addition, this imaging equipment comprises rhodium or tungsten anodes instead of molybdenum anodes.

It is particularly desirable that the radiographic silver halide films be processed within 90 seconds ("dry-to-dry") and preferably within 60 seconds and at least 20 seconds, for the developing, fixing, any washing (or rinsing) steps, and drying. Such processing can be carried out in any suitable processing equipment including but not limited to, a Kodak X-OMAT™ RA 480 processor that can utilize Kodak Rapid Access processing chemistry. Other "rapid access processors" are described for example in U.S. Pat. No. 3,545,971 (Barnes et al.) and EP 0 248,390A1 (Akio et al.). Preferably, the black-and-white developing compositions used during processing are free of any gelatin hardeners, such as glutaraldehyde.

Since rapid access processors employed in the industry vary in their specific processing cycles and selections of processing compositions, the preferred radiographic films satisfying the requirements of the present invention are specifically identified as those that are capable of dry-to-dye processing according to the following reference conditions:

| | |
|---|---|
| Development | 11.1 seconds at 35° C., |
| Fixing | 9.4 seconds at 35° C., |
| Washing | 7.6 seconds at 35° C., |
| Drying | 12.2 seconds at 55–65° C. |

Any additional time is taken up in transport between processing steps. Typical black-and-white developing and fixing compositions are described in the Example below.

The following example is presented for illustration and the invention is not to be interpreted as limited thereby.

EXAMPLE

Radiographic Film A:

Radiographic Film A was a single-coated film having the a silver halide emulsion on one side of a blue-tinted 170 μm transparent poly(ethylene terephthalate) film support and a pelloid layer on the opposite side. The emulsion was chemically sensitized with sulfur and gold and spectrally sensitized with the following dye A-1:

A-1

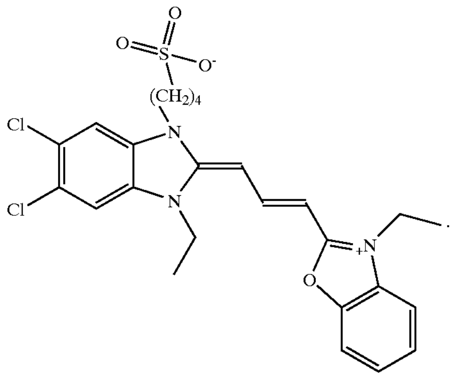

Radiographic Film A had the following layer arrangement:

Overcoat

Interlayer

Emulsion Layer

Support

Pelloid Layer

Overcoat

The noted layers were prepared from the following formulations.

| | Coverage (mg/dm$^2$) |
|---|---|
| Overcoat Formulation | |
| Gelatin vehicle | 4.4 |
| Methyl methacrylate matte beads | 0.35 |
| Carboxymethyl casein | 0.73 |
| Colloidal silica (LUDOX AM) | 1.1 |
| Polyacrylamide | 0.85 |
| Chrome alum | 0.032 |
| Resorcinol | 0.073 |
| Dow Corning Silicone | 0.153 |
| TRITON X-200 surfactant (Union Carbide) | 0.26 |
| LODYNE S-100 surfactant (Ciba Specialty Chem.) | 0.0097 |
| Interlayer Formulation | |
| Gelatin vehicle | 4.4 |
| Emulsion Layer Formulation | |
| Cubic grain emulsion [AgBr 0.85 μm average size] | 51.1 |
| Gelatin vehicle | 34.9 |
| Spectral sensitizing dye A-1 | 250 mg/Ag mole |
| 4-Hydroxy-6-methyl-1,3,3a,7-tetraazaindene | 1 g/Ag mole |
| Maleic acid hydrazide | 0.0075 |
| Catechol disulfonate | 0.42 |
| Glycerin | 0.22 |
| Potassium bromide | 0.14 |
| Resorcinol | 2.12 |
| Bisvinylsulfonylmethylether | 0.4% based on total gelatin in all layers on that side |

-continued

| | Coverage ($mg/dm^2$) |
|---|---|
| Pelloid Layer | |
| Gelatin | 43 |
| Dye C-1 noted below | 0.31 |
| Dye C-2 noted below | 0.11 |
| Dye C-3 noted below | 0.13 |
| Dye C-4 note below | 0.12 |
| Bisvinylsulfonylmethylether | 0.4% based on total gelatin in all layers on that side. |

C-1

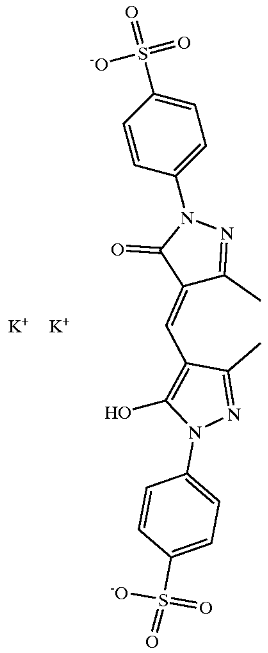

C-2

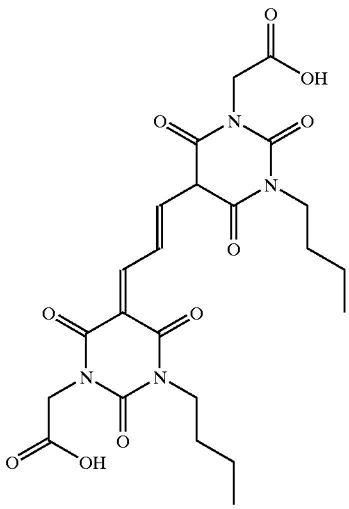

-continued

C-3

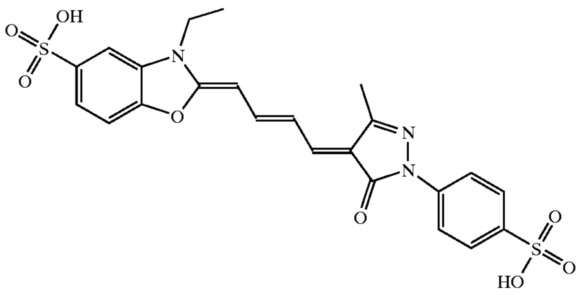

C-4

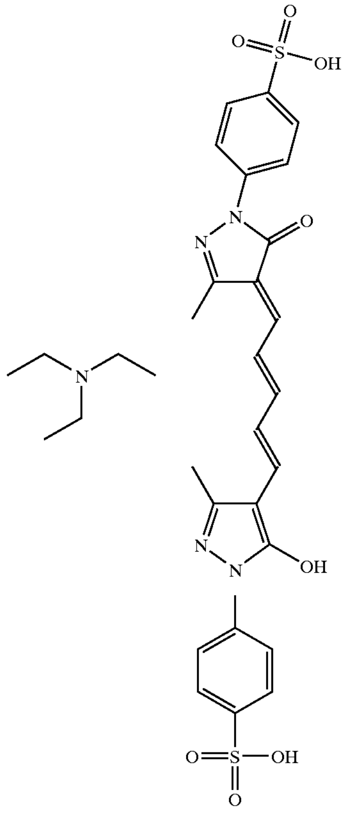

Radiographic Film B:

Radiographic Film B was a dual-coated radiographic film with ⅔ of the silver and gelatin coated on one side of the support and the remainder coated on the opposite side of the support. It also included a halation control layer containing solid particle dyes to provide improved sharpness. The film contained a green-sensitive, high aspect ratio tabular silver bromide grain emulsion on both sides of the support. Thus, at least 50% of the total grain projected area is accounted for by tabular grains having a thickness of less than 0.3 μm and having an average aspect ratio greater than 8:1. The emulsion average grain diameter was 2.0 μm and the average grain thickness was 0.10 μm. It was polydisperse in distribution and had a coefficient of variation of 38. The emulsion was spectrally sensitized with anhydro-5,5-dichloro-9-ethyl-3,3'-bis(3-sulfopropyl)oxa-carbocyanine hydroxide (680 mg/Ag mole), followed by potassium iodide (300 mg/Ag mole). The frontside cubic grain silver halide emulsion comprised cubic grains spectrally sensitized with a 1:1 molar ratio of dyes A-2 and B-1 (noted above). The cubic grains were doped with ruthenium hexacyanide (50 mg/Ag mole). Film B had the following layer arrangement and formulations on the film support:

Overcoat 1

Interlayer

Emulsion Layer 1

Support

Emulsion Layer 2

Halation Control Layer

Overcoat 2

| | Coverage (mg/dm$^2$) |
|---|---|
| Overcoat 1 Formulation | |
| Gelatin vehicle | 4.4 |
| Methyl methacrylate matte beads | 0.35 |
| Carboxymethyl casein | 0.73 |
| Colloidal silica (LUDOX AM) | 1.1 |
| Polyacrylamide | 0.85 |
| Chrome alum | 0.032 |
| Resorcinol | 0.73 |
| Dow Corning Silicone | 0.153 |
| TRITON X-200 surfactant | 0.26 |
| LODYNE S-100 surfactant | 0.0097 |
| Interlayer Formulation | |
| Gelatin vehicle | 4.4 |
| Emulsion Layer 1 Formulation | |
| Cubic grain emulsion [AgIClBr 5:15:84.5 halide molar ratio 0.73 $\mu$m average size] | 40.3 |
| Gelatin vehicle | 22.6 |
| Dextran | 8.1 |
| 4-Hydroxy-6-methyl-1,3,3a,7-tetraazaindene | 1 g/Ag mole |
| 1-(3-Acetamidophenyl)-5-mercaptotetrazole | 0.026 |
| Maleic acid hydrazide | 0.0076 |
| Catechol disulfonate | 0.2 |
| Glycerin | 0.22 |
| Potassium bromide | 0.13 |
| Resorcinol | 2.12 |
| Bisvinylsulfonylmethane | 0.8% based on total gelatin in all layers on that side |
| Emulsion Layer 2 Formulation | |
| Tabular grain emulsion [AgBr 2.9 × 0.10 $\mu$m average size] | 10.7 |
| Gelatin vehicle | 16.1 |
| 4-Hydroxy-6-methyl-1,3,3a,7-tetraazaindene | 2.1 g/Ag mole |
| 1-(3-Acetamidophenyl)-5-mercaptotetrazole | 0.013 |
| Maleic acid hydrazide | 0.0032 |
| Catechol disulfonate | 0.2 |
| Glycerin | 0.11 |
| Potassium bromide | 0.06 |
| Resorcinol | 1.0 |
| Bisvinylsulfonylmethane | 2% based on total gelatin in all layers on that side |
| Halation Control Layer | |
| Magenta filter dye M-1 (noted above) | 2.2 |
| Gelatin | 10.8 |

-continued

| | Coverage (mg/dm$^2$) |
|---|---|
| Overcoat 2 Formulation | |
| Gelatin vehicle | 8.8 |
| Methyl methacrylate matte beads | 0.14 |
| Carboxymethyl casein | 1.25 |
| Colloidal silica (LUDOX AM) | 2.19 |
| Polyacrylamide | 1.71 |
| Chrome alum | 0.066 |
| Resorcinol | 0.15 |
| Dow Corning Silicone | 0.16 |
| TRITON X-200 surfactant | 0.26 |
| LODYNE S-100 surfactant | 0.01 |

The cassettes used in the practice of this invention were those commonly used in mammography.

Fluorescent intensifying screen "X" had the same composition and structure as commercially available KODAK Min-R 2000 Screen. It comprised a terbium activated gadolinium oxysulfide phosphor (median particle size of about 4.0 $\mu$m) dispersed in a Permuthane™ polyurethane binder on a blue-tinted poly(ethylene terephthalate) film support. The total phosphor coverage was 315 g/m$^2$ and the phosphor to binder weight ratio was 21:1.

In the practice of this invention, a single screen X was placed in back of the film to form a radiographic imaging assembly.

Samples of the films in the imaging assemblies were imaged using a commercially available GE DMR Mammographic X-ray unit equipped with molybdenum anodes. It was capable of accelerating voltages of 25,000–40,000 volts. Images were made using an RMI 156 phantom (available from Gammex-RMI, Middleton, Wis.), and RMI phantom 165, and a Kodak-Pathe phantom "Indicateur de Technique Operative".

The film samples were processed using a processor commercially available under the trademark KODAK RP X-OMAT® film Processor M6A-N, M6B, or M35A. Development was carried out using the following black-and-white developing composition:

| | |
|---|---|
| Hydroquinone | 30 g |
| Phenidone | 1.5 g |
| Potassium hydroxide | 21 g |
| $NaHCO_3$ | 7.5 g |
| $K_2SO_3$ | 44.2 g |
| $Na_2S_2O_5$ | 12.6 g |
| Sodium bromide | 35 g |
| 5-Methylbenzotriazole | 0.06 g |
| Glutaraldehyde | 4.9 g |
| Water to 1 liter, pH 10 | |

The film samples were processed in each instance for less than 90 seconds (dry-to-dry). Fixing was carried out using KODAK RP X-OMAT® LO Fixer and Replenisher fixing composition (Eastman Kodak Company).

Optical densities are expressed below in terms of diffuse density as measured by a conventional X-rite Model 310™ densitometer that was calibrated to ANSI standard PH 2.19 and was traceable to a National Bureau of Standards calibration step tablet. The characteristic D vs. log E curve was plotted for each radiographic film that was imaged and processed. Speed was measured at a density of 1.4+$D_{min}$. Gamma (contrast) is the slope (derivative) of the noted curves.

"Entrance Exposure" (mR) refers to the amount of X-radiation exposure (measured in milliRoentgens) that impinges on the surface of the phantom (or patient) closest to the X-radiation source.

The "ΔDensity" refers to the difference in diffuse optical density between two specified parts of the phantom (or patient).

"Image noise" was determined by a visual comparison of the resulting image to an image obtained using the conventional KODAK Min-R 2000 Mammography film and KODAK Min-R 2000 intensifying screen. The resulting images were rated by an experienced observer on a scale of from 1 to 6 where a rating of "1" represents the lowest noise and a rating of "6" represents the highest noise.

"Image resolution" refers to the ability of an experienced observer to discern discrete lines in a low contrast resolution test pattern. Resolution was measured in a line pair per millimeter. The resulting images were rated by a very experienced observer on a scale of from 1 to 6 where a rating of "1" represents the highest resolution and a rating of "6" represents the lowest resolution.

"Image quality" refers to the ability of a human observer easily and clearly to discern low contrast objects and fine details in the phantoms (or patients). The resulting images were rated by an experienced observer on a scale of from 1 to 6 where a rating of "1" represents the best image quality and a rating of "6" represents the poorest image quality.

The following TABLE I shows the results of imaging and processing of Films A and B. Film A was imaged using a conventional dose (28 kVp) and conventional molybdenum anodes. The present invention, using Film B, was practiced using higher kVp and rhodium anodes to provide acceptable image quality but with significantly lower patient dosage.

TABLE I

| Film | kVp | Screen | Target/-Filter* | Entrance Exposure (mR) | ΔDensity | Image Resolution | Image Noise | Image Quality |
|---|---|---|---|---|---|---|---|---|
| A (Control) | 28 | X | Mo/Mo | 1× | 1× | 2 | 2 | 4 |
| A (Control) | 30 | X | Rh/Rh | 0.45× | 0.85× | 3.5 | 3 | 6.5 |
| B (Invention) | 30 | X | Rh/Rh | 0.45× | 0.98× | 2 | 2 | 4 |

*"Mo" refers to molybdenum anodes, and "Rh" refers to rhodium anodes.

The invention has been described in detail with particular reference to preferred embodiments thereof, but it will be understood that variations and modifications can be effected within the spirit and scope of the invention.

We claim:

1. A method of imaging for mammography comprising exposing a patient to X-radiation at a peak voltage greater than 28 kVp using an X-radiation generating device comprising rhodium or tungsten anodes, and providing a black-and-white image of the exposed patient using an imaging assembly comprising:

A) a radiographic silver halide film that comprises a support having first and second major surfaces and that is capable of transmitting X-radiation, said radiographic silver halide film having disposed on said first major support surface, one or more hydrophilic colloid layers including at least one cubic grain silver halide emulsion layer, and having disposed on said second major support surface, one or more hydrophilic colloid layers including at least one tabular grain silver halide emulsion layer, wherein said film can be exposed to provide a black-and-white image having a d(γ)/d(log E) value greater than 5, and B) a fluorescent intensifying screen that comprises an inorganic phosphor capable of absorbing X-rays and emitting electromagnetic radiation having a wavelength greater than 300 nm.

2. The method of claim 1 wherein said imaging assembly comprises:

A) a radiographic silver halide film that has a photographic speed of at least 100 and comprises a support having first and second major surfaces and that is capable of transmitting X-radiation, said radiographic silver halide film having disposed on said first major support surface, one or more hydrophilic colloid layers including at least one cubic grain silver halide emulsion layer, and having disposed on said second major support surface, one or more hydrophilic colloid layers including at least one tabular grain silver halide emulsion layer, wherein said cubic grain silver halide emulsion layer comprises:

1) a combination of first and second spectral sensitizing dyes that provides a combined maximum J-aggregate absorption on said cubic silver halide grains of from about 540 to about 560 nm, and wherein said first spectral sensitizing dye is an anionic benzimidazole-benzoxazole carbocyanine, said second spectral sensitizing dye is an anionic oxycarbocyanine, and said first and second spectral sensitizing dyes are present in a molar ratio of from about 0.25:1 to about 4:1, 2) a mixture of a first hydrophilic binder that is gelatin or a gelatin derivative and a second hydrophilic binder other than gelatin or a gelatin derivative, wherein the weight ratio of said first hydrophilic binder to said second hydrophilic binder is from about 2:1 to about 5:1, and the level of hardener in said cubic grain silver halide emulsion layer is from about 0.4 to about 1.5 weight % based on the total weight of said first hydrophilic binder in said cubic grain silver halide emulsion layer, 3) cubic silver halide grains comprising from about 1 to about 20 mol % chloride and from about 0.25 to about 1.5 mol % iodide, both based on total silver in said cubic grain emulsion layer, which cubic silver halide grains have an average ECD of from about 0.65 to about 0.8 μm, and 4) cubic silver halide grains that are doped with a hexacoordination complex compound within part or all of 95% of the innermost volume from the center of said cubic silver halide grains, and B) a fluorescent intensifying screen that comprises an inorganic phosphor capable of absorbing X-rays and emitting electromagnetic radiation having a wavelength greater than 300 nm.

3. The method of claim 2 wherein said first spectral sensitizing dye is represented by the following Structure I:

(I)

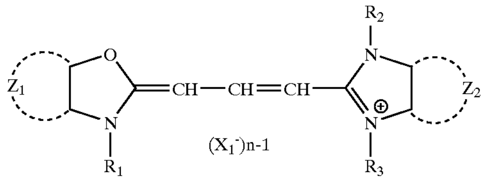

wherein $Z_1$ and $Z_2$ represent the carbon atoms necessary to form a substituted or unsubstituted benzene or naphthalene ring, $R_1$, $R_2$, and $R_3$ are independently substituted or unsubstituted alkyl, alkoxy, aryl, or alkenyl groups, $X_1^-$ is an anion, and n is 1 or 2, and said second spectral sensitizing dye is represented by the following Structure II:

(II)

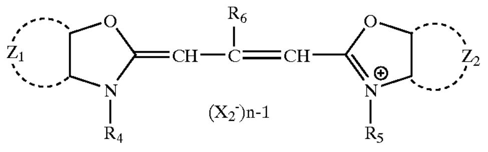

wherein $Z_1$ and $Z_2$ represent the carbon atoms necessary to form a substituted or unsubstituted benzene or naphthalene ring, $R_4$ and $R_5$ are independently substituted or unsubstituted alkyl, alkoxy, aryl, or alkenyl groups, $R_6$ is hydrogen or a substituted or unsubstituted alkyl or phenyl group, $X_2^-$ is an anion, and n is 1 or 2.

4. The method of claim 2 wherein the total amount of said combination of said first and second spectral sensitizing dyes is from about 0.25 to about 0.75 mol/mole of silver, and said first and second spectral sensitizing dyes are present in a molar ratio of from about 0.5:1 to about 1.5:1.

5. The method of claim 2 wherein said combination of said first and second spectral sensitizing dyes provide a combined J-aggregate absorption of from about 545 to about 555 nm when said dyes are absorbed on said cubic silver halide grains.

6. The method of claim 2 wherein said first spectral sensitizing dye is selected from the following Compounds A-1 to A-7, and the second spectral sensitizing dye is selected from the following Compounds B-1 to B-5:

A-1

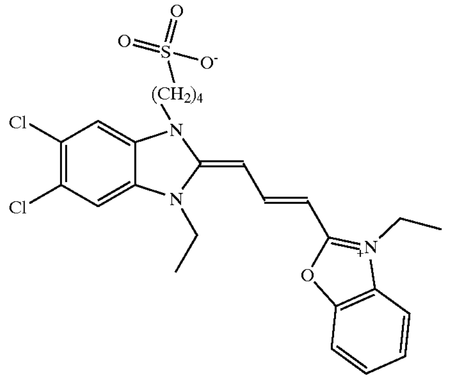

A-2

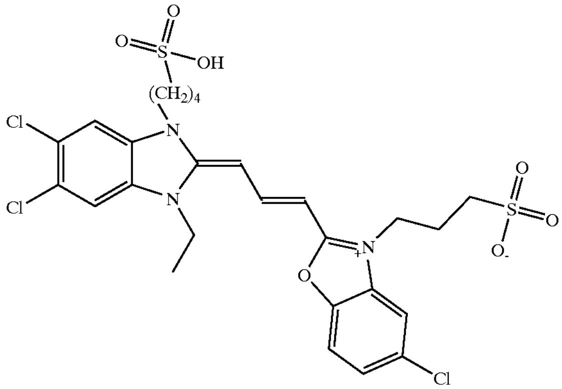

A-3

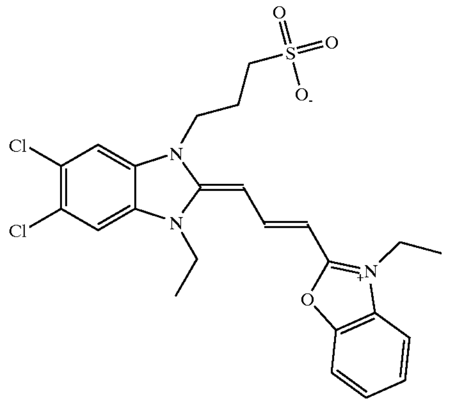

A-4

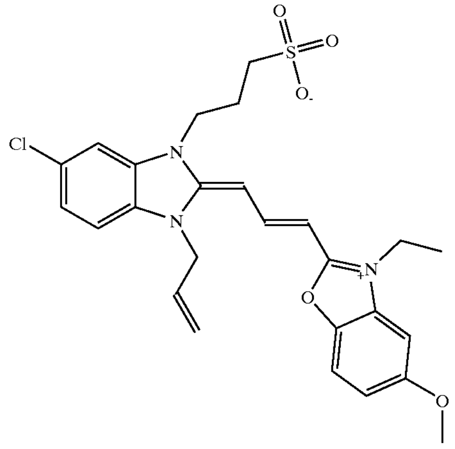

-continued
A-5
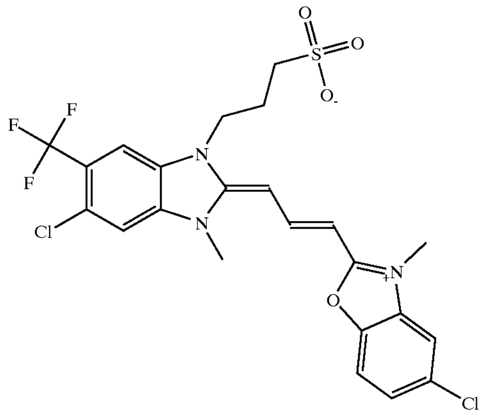
A-6
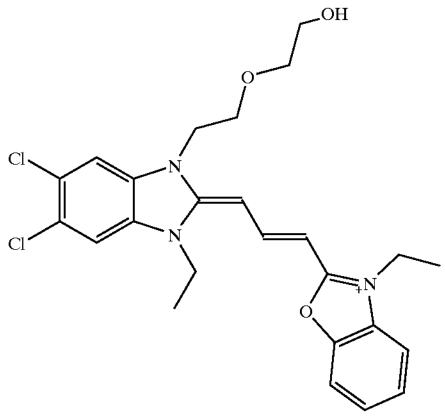
A-7
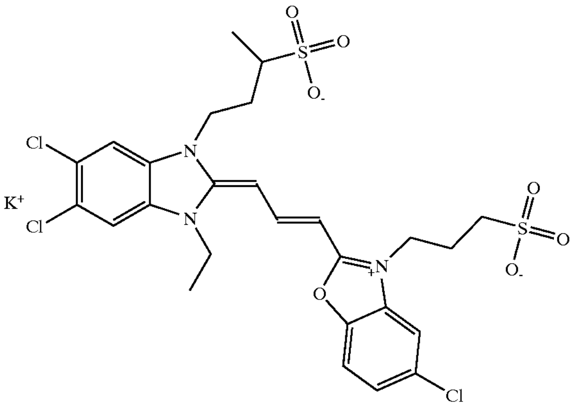
-continued
B-1
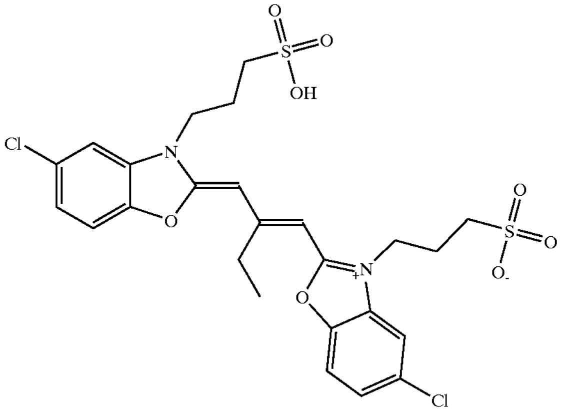
B-2
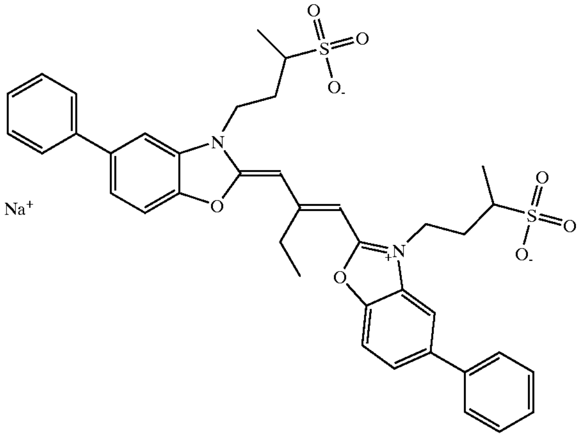
B-3
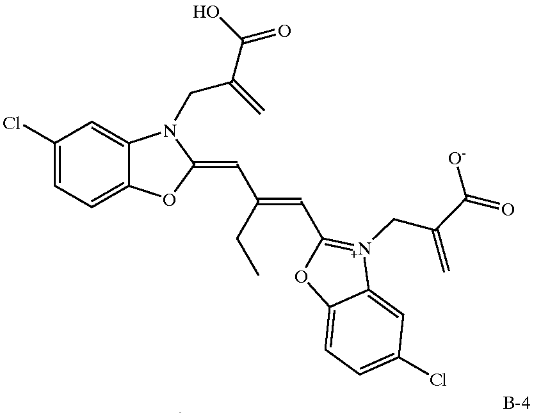
B-4
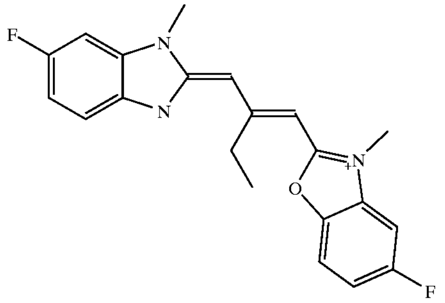

-continued

B-5

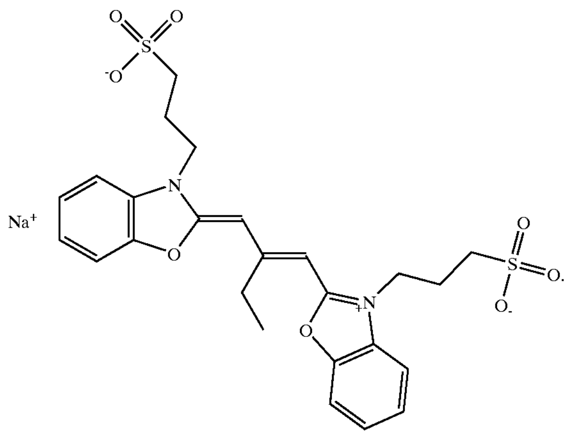

7. The method of claim 2 wherein said hexacoordination complex compound is present in an amount of from about $1\times10^{-6}$ to about $5\times10^{-4}$ mole per mole of silver in the silver halide emulsion layer in which it is present.

8. The method of claim 2 wherein said hexacoordination complex compound is present within the innermost 90% of the volume of said cubic silver halide grains.

9. The method of claim 2 wherein said hexacoordination complex compound is present within 75 to 80% of the innermost volume from the center of said cubic silver halide grains.

10. The method of claim 2 wherein said hexacoordination complex compound is represented by the following Structure I:

$$[ML_6]^n$$

wherein M is a Group 8 polyvalent transition metal ion, L represents six coordination complex ligands that can be the same or different provided that at least four of the ligands are anionic ligands and at least one of said ligands is more electronegative than any halide ligand, and n is −2, −3, or −4.

11. The method of claim 10 wherein M is $Fe^{+2}$, $Ru^{+2}$, $Os^{+2}$, $Co^{+3}$, $Rh^{+3}$, $Ir^{+3}$, $Pd^{+3}$, or $Pt^{+4}$.

12. The method of claim 10 wherein M is $Ru^{+2}$, and at least three of L are cyanide ions.

13. The method of claim 2 wherein said cubic silver halide grains are composed of from about 10 to about 20 mol % chloride, based on total silver in the emulsion layer.

14. The method of claim 2 wherein said cubic silver halide grains are composed of from about 0.5 to about 1 mol % iodide, based on total silver in said cubic grain silver halide emulsion layer.

15. The method of claim 2 wherein the weight ratio of said first hydrophilic binder to said second hydrophilic binder is from about 2.5:1 to about 3.5:1, and the level of said hardener is from about 0.5 to about 1.5 weight % based on the total weight of said first hydrophilic binder in said cubic grain silver halide emulsion layer.

16. The method of claim 2 wherein said second hydrophilic binder is a dextran or polyacrylamide.

17. A method of imaging for mammography comprising exposing a patient to X-radiation at a peak voltage greater than 28 kVp, said X-radiation generated using rhodium anodes in an X-radiation generating device, and providing a black-and-white image of said exposed patient using an imaging assembly comprising:

A) a radiographic silver halide film having a photographic speed of at least 100 and comprising a transparent film support having first and second major surfaces and that is capable of transmitting X-radiation, said radiographic silver halide film having disposed on said first major support surface, one or more hydrophilic colloid layers including at least one silver halide emulsion layer, and having disposed on said second major support surface, one or more hydrophilic colloid layers including at least one tabular grain silver halide emulsion layer, said film also comprising a protective overcoat layer disposed on both sides of said support, wherein said cubic grain silver halide emulsion layer comprises:

1) a combination of first and second spectral sensitizing dyes that provides a combined maximum J-aggregate absorption of from about 545 to about 555 nm when said dyes are absorbed on the surface of said cubic silver halide grains, wherein said first spectral sensitizing dye is the following Dye A-2, and wherein said second spectral sensitizing dye is following Dye B-1, said first and second spectral sensitizing dyes being present in a molar ratio of from about 0.5:1 to about 1.5:1, and the total spectral sensitizing dyes in said film is from about 0.25 to about 0.75 mg/mole of silver,

A-2

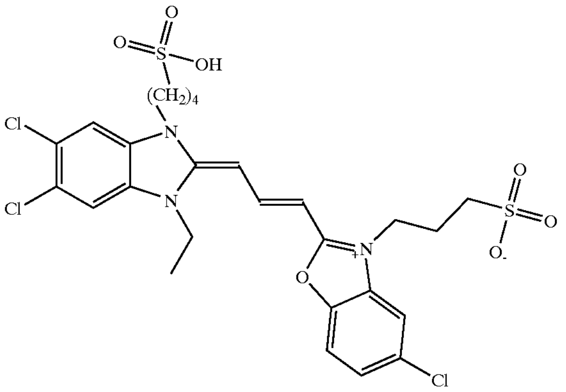

B-1

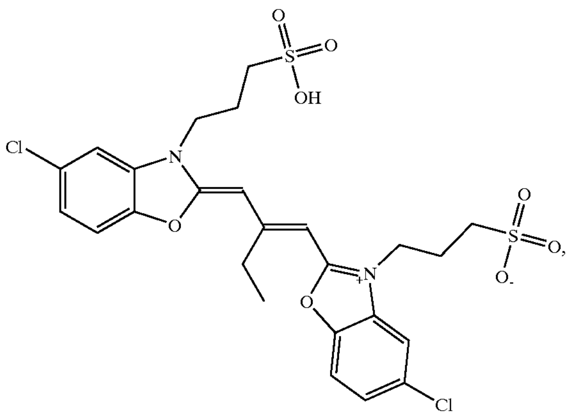

2) a mixture of a first hydrophilic binder that is gelatin or a gelatin derivative and a second hydrophilic binder that is a dextran or polyacrylamide, wherein the weight ratio of said first hydrophilic binder to said second hydrophilic binder is from about 2.5:1 to about 3.5:1 and the level of hardener in said cubic grain silver halide emulsion is from about 0.5 to about 1.5 weight % based on the total weight of said first hydrophilic binder in said cubic grain silver halide emulsion layer, 3) cubic silver halide grains comprising from about 10 to about 20 mol % chloride and from about 0.5 to about 1 mol % iodide, both based on total silver in said cubic grain silver halide emulsion layer, which cubic silver halide grains have an average ECD of from about 0.72 to about 0.76 $\mu$m, and 4) cubic silver halide grains that are doped with a hexacoordination complex compound within 75 to 80% of the innermost volume from the center of said cubic silver halide grains, wherein said hexacoordination complex compound is represented by the following Structure I:

$$[ML_6]^n$$

wherein M is $Fe^{+2}$, $Ru^{+2}$, $Os^{+2}$, $Co^{+3}$, $Rh^{+3}$, $Ir^{+3}$, $Pd^{+3}$, or $Pt^{+4}$, L represents six coordination complex ligands that can be the same or different provided that at least three of the ligands are cyanide ions, and n is −2, −3, or −4, and B) a single fluorescent intensifying screen that comprises an inorganic phosphor capable of absorbing X-rays and emitting electromagnetic radiation having a wavelength greater than 300 nm, said inorganic phosphor being coated in admixture with a polymeric binder in a phosphor layer disposed on a flexible support and having a protective overcoat disposed over said phosphor layer.

18. The method of claim 2 further comprising processing said radiographic silver halide film, sequentially, with a black-and-white developing composition and a fixing composition, said processing being carried out within 90 seconds, dry-to-dry.

19. The method of claim 18 being carried out for 60 seconds or less, dry-to-dry.

* * * * *

UNITED STATES PATENT AND TRADEMARK OFFICE

CERTIFICATE OF CORRECTION

PATENT NO. : 6,887,641 B2 Page 1 of 1
DATED : May 3, 2005
INVENTOR(S) : Robert E. Dickerson et al.

It is certified that error appears in the above-identified patent and that said Letters Patent is hereby corrected as shown below:

<u>Column 32</u>,
Structure B-4, should be:

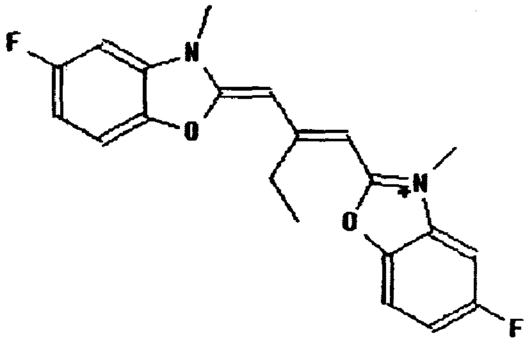

B-4

Signed and Sealed this

First Day of November, 2005

JON W. DUDAS
*Director of the United States Patent and Trademark Office*